(12) United States Patent
Shi et al.

(10) Patent No.: US 10,947,955 B2
(45) Date of Patent: Mar. 16, 2021

(54) MULTI-ENERGY POWER GENERATION SYSTEM BASED ON FLOATING TYPE PLATFORM

(71) Applicant: DALIAN UNIVERSITY OF TECHNOLOGY, Dalian (CN)

(72) Inventors: Wei Shi, Dalian (CN); Yapo Wang, Dalian (CN); Lixian Zhang, Dalian (CN); Ye Tang, Dalian (CN); Jikun You, Dalian (CN); Dezhi Ning, Dalian (CN); Bin Teng, Dalian (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 16/631,125

(22) PCT Filed: Jun. 10, 2019

(86) PCT No.: PCT/CN2019/090457
§ 371 (c)(1),
(2) Date: Jan. 14, 2020

(87) PCT Pub. No.: WO2020/151160
PCT Pub. Date: Jul. 30, 2020

(65) Prior Publication Data
US 2020/0362821 A1    Nov. 19, 2020

(30) Foreign Application Priority Data

Jan. 23, 2019    (CN) .......................... 201910063277.1

(51) Int. Cl.
*F03D 9/00* (2016.01)
*F03D 9/25* (2016.01)
(Continued)

(52) U.S. Cl.
CPC ............ *F03D 9/008* (2013.01); *F03B 13/142* (2013.01); *F03D 9/25* (2016.05); *F03D 13/25* (2016.05); *H02J 3/381* (2013.01); *H02J 2300/28* (2020.01)

(58) Field of Classification Search
CPC ........ F03B 13/14; F03B 13/142; F03B 13/24; F05B 2210/40; F05B 2240/93;
(Continued)

(56) References Cited

U.S. PATENT DOCUMENTS

| 4,377,989 A * | 3/1983 | Tholen ................... F01P 7/042 |
| | | 123/41.12 |
| 2009/0206608 A1* | 8/2009 | Koola ................... F03B 13/142 |
| | | 290/53 |

(Continued)

FOREIGN PATENT DOCUMENTS

| CN | 101915202 A | 12/2010 |
| CN | 103832557 A | 6/2014 |

(Continued)

*Primary Examiner* — Julio C. Gonzalez
(74) *Attorney, Agent, or Firm* — Muncy, Geissler, Olds & Lowe, P.C.

(57) ABSTRACT

A multi-energy power generation system based on a floating type platform which is specifically a wind turbine-oscillating water column type wave energy integrated power generation system based on a TLP floating type platform. The wind turbine-oscillating water column type wave energy integrated power generation system based on the TLP floating type platform includes an offshore wind power generation system and oscillating water column type wave energy power generation devices, and the integrated power generation system which integrates wind energy and an oscillating water column type wave energy system into a whole is established utilizing a TLP platform supporting structure in the ocean.

2 Claims, 2 Drawing Sheets

(51) Int. Cl.
*F03D 13/25* (2016.01)
*F03B 13/14* (2006.01)
*H02J 3/38* (2006.01)

(58) Field of Classification Search
CPC ......... Y02E 10/32; Y02E 10/38; F03D 9/008; F03D 13/22; F03D 13/25; F03D 9/25; H02J 3/381; H02J 2300/28
See application file for complete search history.

(56) References Cited

U.S. PATENT DOCUMENTS

| | | | |
|---|---|---|---|
| 2010/0038912 A1* | 2/2010 | McCarthy | F03B 13/142 290/53 |
| 2011/0225965 A1* | 9/2011 | Van Niekerk | F03B 13/142 60/497 |
| 2017/0184072 A1* | 6/2017 | Zabala | F03B 13/24 |
| 2020/0040865 A1* | 2/2020 | Shi | F03B 13/24 |

FOREIGN PATENT DOCUMENTS

| | | |
|---|---|---|
| CN | 107387327 A | 11/2017 |
| CN | 107575337 A | 1/2018 |
| CN | 108061010 A | 5/2018 |
| CN | 109026542 A | 12/2018 |
| CN | 109653935 A | 4/2019 |
| WO | WO 2009/064737 A1 | 5/2009 |
| WO | WO 2009/078735 A1 | 6/2009 |

\* cited by examiner

MULTI-ENERGY POWER GENERATION SYSTEM BASED ON FLOATING TYPE PLATFORM

FIELD OF THE INVENTION

The invention belongs to the technical field of marine renewable energy utilization, and particularly relates to a multi-energy power generation system based on a floating platform, wherein the platform is an integrated power generation system which combines the wind energy and the oscillation water column (OWC)-type wave energy converter (WEC) device based on Tension Leg Platform (TLP) floating type platform.

BACKGROUND

With the rapid development of the world economy, the contradiction between energy supply and demand is increasingly prominent and the energy problem is increasingly serious. On the other hand, a large amount of fossil energy consumption also causes environmental deterioration, leading to global warming and frequent climate extremes. Therefore, the adjustment of energy structure is urgent and the development of renewable energy is imperative. The development and utilization of marine renewable energy has become the focus of the development of renewable energy worldwide. Also, the development and utilization of renewable energy is of strategic significance for our country to control air pollution and adjust energy structure. As the most promising marine renewable energy, wind energy and wave energy have been paid more and more attention. Due to low energy conversion efficiency, high power generation cost and low reliability, the commercial development of wave energy generation device is limited to some extent. With the development of offshore wind power technology, the industry goes from nearshore to deep water but the floating offshore wind technology is still in the early stage of development. Among the floating wind turbine demonstration projects in other countries, we have: Semisubmersible, Spar, TLP, and Barge. Due to its good motion performance, TLP has a good stability performance and a great potential. With the development of China offshore wind installation equipment and installation technology, TLP platform will have a good application perspective in offshore wind industry.

Fully combining wind energy and wave energy power generation equipment will effectively improve the utilization efficiency of marine space resources, improve the economy of the overall power generation system, and is an effective way to promote the industrialization of wave energy power generation.

SUMMARY

The present invention provides a multi energy power generation system based on TLP platform, and an integrated power generation system integrating wind energy and oscillating water column wave energy system is established by using TLP platform support structure in the ocean. The present invention will make full use of marine renewable resources, improve the utilization rate of TLP platform and reduce the total cost, so as to improve the economic efficiency.

The technical solution of the invention:

A multi-energy power generation system based on a floating type platform, which is a wind turbine-OWC WEC device integrated power generation system based on TLP floating platform, including an offshore wind power generation system and an OWC-type WEC device 3;

the offshore wind power generation system comprises a wind turbine 1, a tower 2 and a TLP platform 8; the wind turbine 1 is a megawatt level horizontal axis wind turbine, which is connected with the TLP platform 8 through the tower 2; the TLP platform 8 is connected with the seabed 7 through tension tendon 6 and anchoring system 11;

the OWC-type WEC device 3 is fixed on three pontoons of TLP platform 8 through strut 5; the OWC-type WEC device 3 includes shell body, air chamber 10 and air turbine generator 9 of the wave energy generating device; the space in the shell body of the wave energy generating device is the air chamber 10, the wave enters from all directions, and the top is provided with a circular air outlet; the air turbine generator 9 is installed at the air outlet; the wind turbine oscillating water column wave energy integrated power generation system based on TLP floating platform will be placed in the water area for utilization, under the action of waves, the waves enter the air chamber 10 through the OWC-type WEC device 3 to form the oscillating water column of up and down vibration, and the oscillating water column makes up and down reciprocating motion to make the gas in the air chamber 10 reciprocally pass through the air outlet at the top of chamber 10, which drives the air turbine generator 9 to generate electricity;

the upper part of the air chamber 10 is a mushroom shaped rotating parabola, and the lower part is a hollow cylinder, which ensures the increase of the pressure at the end of the air flow, promotes the rotation of the air turbine generator 9 faster, and improves the power generation efficiency; three diagonal steel braces are arranged in the air chamber 10 to realize the solid connection of the air chamber 10 and the pillar.

The air turbine generator 9 adopts a bidirectional air turbine generator;

the oscillating water column type wave energy generator transforms the up and down reciprocating motion of the water column into the reciprocating motion of the gas, and then completes the wave energy generation through the air turbine generator. The present invention makes full use of the advantages of the TLP, the wave energy device sharing platform and the power transmission system.

The wave energy power generation device is symmetrically arranged on three pontoons of the TLP platform in the circumferential direction, which would appropriately reduce the wave load.

The invention has the advantages of:

(1) TLP platform fan has good motion response characteristics, well overall stability and broad development prospects.

(2) The present invention effectively combines the offshore wind power with the wave energy power generation device, shares the offshore platform, voltage transformation, power transmission and other equipment, improves the overall power generation, increases the power generation capacity and effective working hours, and reduces the investment cost.

(3) The mushroom shaped wave energy device reduces the wave load and improves the stability of the system.

(4) The new floating multi energy power generation system improves the effective utilization of sea area, reduces the construction cost and maintenance cost, and promotes the commercialization of wave energy devices.

In the figure: 1 wind turbine; 2 tower; 3 OWC-type WEC device; 4 steel brace; 5 strut; 6 tension tendon; 7 seabed; 8 TLP platform; 9 air turbine generator; 10 air chamber; 11 anchoring system.

DETAILED DESCRIPTION

To better understand the invention, the invention will be further described in combination with the drawings and technical solutions.

Figure 1:
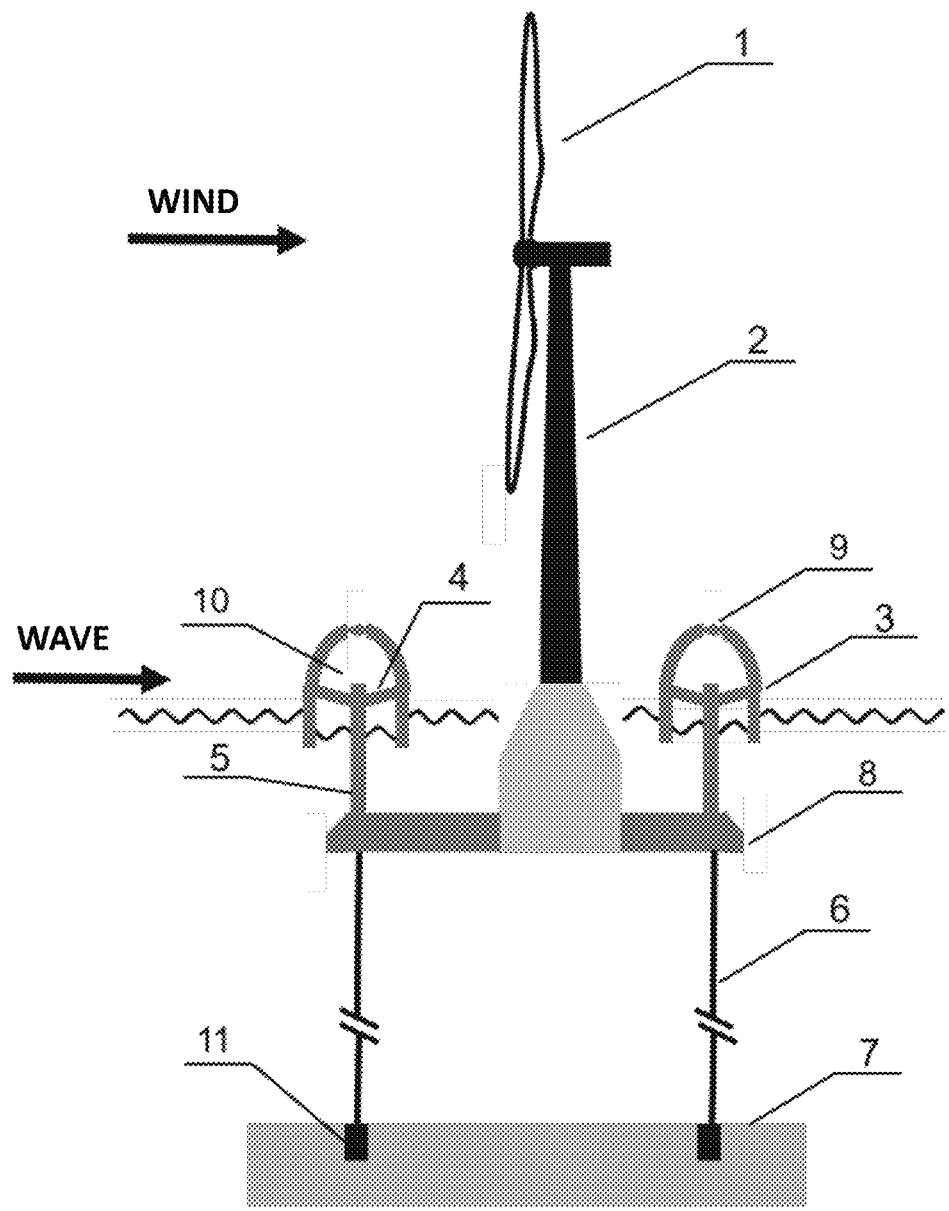
FIG. 1 is a structural diagram of a floating wind-wave energy integrated system of the invention.
Figure 2:
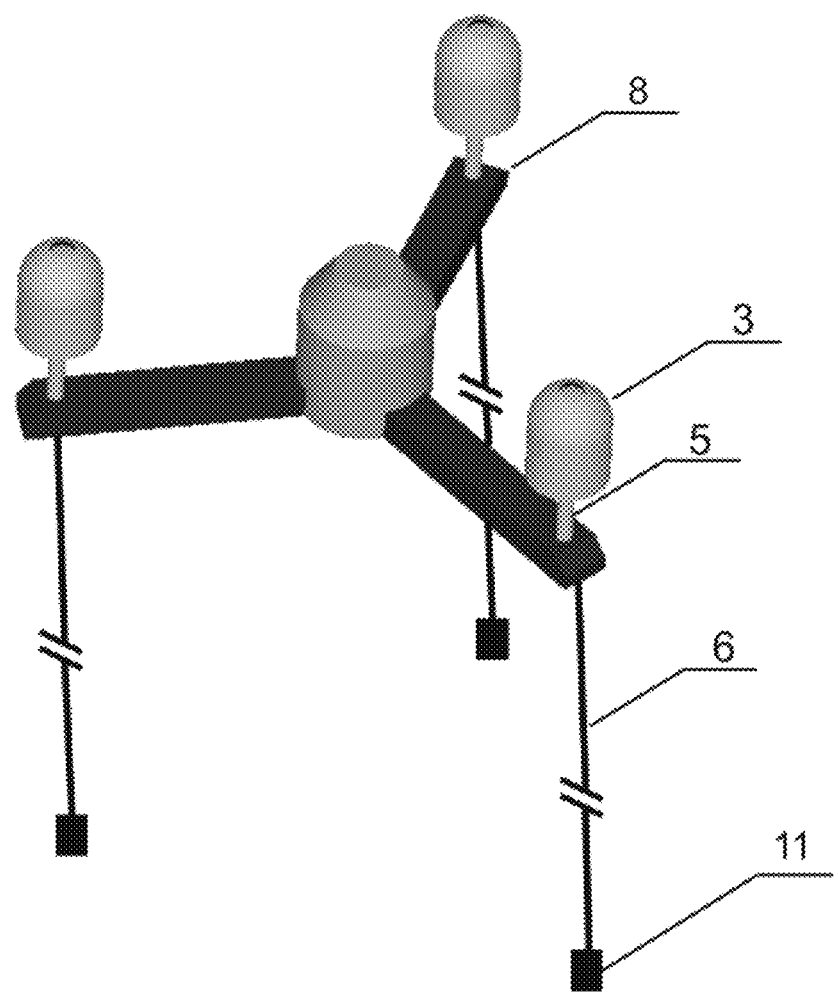
FIG. 2 is a three-dimensional diagram of the floating wind-wave energy integrated system of the invention.

FIG. 1 and FIG. 2 show an embodiment of a multi energy power generation system based on a floating platform.

As shown in FIG. 1, horizontal-axis wind turbine 1 is connected to TLP floating platform 8 through tower 2. Wave energy power generation device is an oscillating water column type wave energy power generation device. The wave energy power generation device is located near the sea horizon of TLP platform. Wave energy power generation device 3 is fastened on the strut 5 by steel support 4 which plays the role of supporting wave energy power generation device 3. Driven by the wind, the wind turbine 1 rotates to convert the wind into mechanical energy, and then drives the wind turbine to generate electricity through the gearbox. On the other hand, the water column in the oscillating water column type wave energy power generation device 3 makes reciprocating motion under the external force of wave fluctuation, which is then converted into the reciprocating motion of the gas in the air chamber 10, so as to drive the air turbine generator 9 to generate electricity. The two-way air turbine generator is adopted, so the rise and fall process of the wave can be used for power generation, with good continuity and high efficiency.

Wind turbine 1 generates electric energy under the action of wind; oscillating water column type wave energy power generation device 3 is fixedly connected near the sea horizon through steel brace 4 and strut 5, and the wave flowing to the bottom of wave energy power generation device 3 enters into wave energy power generation device 3. The water column that generates up and down vibration in air chamber 10 causes the gas in air chamber 10 to reciprocate through the air outlet at the upper end of air chamber 10 when the water column vibrates up and down. When the gas reciprocates through the air outlet, the air turbine generator 9 is driven to generate electricity and generate electric energy. After the electric energy generated by wind turbine, and wave energy device is collected, it will be sent to the power grid through transmission system for utilization.

The construction and installation process based on the floating wind-wave energy integrated system is as follows: first, the TLP platform and wave energy power generation device are processed and manufactured on land; then the wave energy generation device is installed on the TLP platform; then the assembled TLP platform and wave energy device will be transported to the designated sea area by using the professional construction ship; then the tension tendon 6 is installed to complete the fixation of the TLP platform and sea bed. Finally, install tower 2 and top fan 1 to complete the construction and installation of multi energy power generation system based on floating platform.

Therefore, the floating foundation based on TLP platform is adopted in the invention, which can adapt to sea areas with different water depths; wind power generation and wave energy power generation are located on the same platform, so that they share the supporting platform and power transmission supporting system, which greatly reduces the cost of power generation; the structure is stable and reasonable, which further proves the feasibility of the invention and has significant technical effect.

The invention claimed is:

1. A multi energy power generation system based on a floating platform, specifically a wind turbine oscillating water column wave energy integrated power generation system based on a tension leg platform (TLP) floating platform, comprising:
    an offshore wind power generation system, comprising:
        a tower;
        a TLP platform connected with a seabed through a tension tendon and an anchoring system; and
        a megawatt level horizontal axis wind turbine connected with the TLP platform through the tower; and
    an oscillating water column-type wave energy converter device (OWC-type WEC device) fixed on three pontoons of the TLP platform through a strut, the OWC-type WEC device comprising:
        a shell body;
        an air chamber, which is a space in the shell body;
        a circular air outlet at a top of the air chamber; and
        an air turbine generator installed at the circular air outlet;
    wherein during operation the wind turbine oscillating water column wave energy integrated power generation system based on TLP floating platform is placed in a water area and under action of waves, the waves enter the air chamber through the OWC-type WEC device and form a water column which oscillates up and down such that the oscillating water column reciprocates up and down to make the gas in the air chamber reciprocate through the air outlet at the top of the air chamber to drive the air turbine generator to generate electricity,
    wherein an upper part of the air chamber is a mushroom shaped rotating parabola, and a lower part is a hollow cylinder, which ensures that a pressure at an end of the air flow increases, so as to promote the rotation of the air turbine generator faster and improve power generation efficiency, and
    wherein three diagonal steel braces are arranged in the air chamber to connect the air chamber to a pillar.

2. The multi energy power generation system based on the floating platform according to claim 1, wherein the air turbine generator uses a bidirectional air turbine generator.

* * * * *